C. H. CLARK.
COUPLING.
APPLICATION FILED MAY 19, 1915.

1,310,002.

Patented July 15, 1919.

INVENTOR
Charles H. Clark
BY
Robert W Byerly
ATTORNEY

UNITED STATES PATENT OFFICE.

CHARLES HASKELL CLARK, OF NEW YORK, N. Y.

COUPLING.

1,310,002.   Specification of Letters Patent.   Patented July 15, 1919.

Application filed May 19, 1915.   Serial No. 29,243.

*To all whom it may concern:*

Be it known that I, CHARLES H. CLARK, a citizen of the United States, residing at New York city, in the county of New York, in the State of New York, have invented certain new and useful Improvements in Couplings, of which the following is a specification.

This invention relates to flexible couplings, such as are described in application for Letters-Patent, Serial Number 813,140, filed by me January 19th, 1914, and has for its object to provide an improvement in the construction illustrated in said application, which is of peculiar importance when the coupling is used in connection with reciprocating machinery.

The flexible coupling described in my aforesaid application comprises two adjacent sprocket wheels or sprocket-cut disks mounted respectively upon the two shafts to be coupled together and held together by means of a chain, which is of a width equal to the combined width of the sprocket wheels so that it may engage the teeth of both. This coupling has proved of value where a constant torque is to be transmitted, as, for example, in connection with electric motor drives. The coupling has, however, been found to have serious disadvantages when used in connection with reciprocating engines or machinery where an irregular turning movement is encountered. When the coupling is applied to such machinery an objectionable back-lash of the chain results; and not only is the noise produced by this back-lash very disagreeable, but the back-lash tends to shake the coupling to pieces, and particularly to break the teeth of the sprocket wheels as well as the links of the chain.

An object of the present invention is to eliminate the back-lash of the chain when the coupling is used in connection with reciprocating engines or other machinery where an irregular torque is to be transmitted. This object is accomplished by the use of a spring, which maintains a large portion of the chain tightly drawn against the sprocket wheels so that no back-lash is possible.

In order that my invention may be clearly understood, I will describe the specific embodiment of it illustrated in the accompanying drawing, in which—

Figure 1:
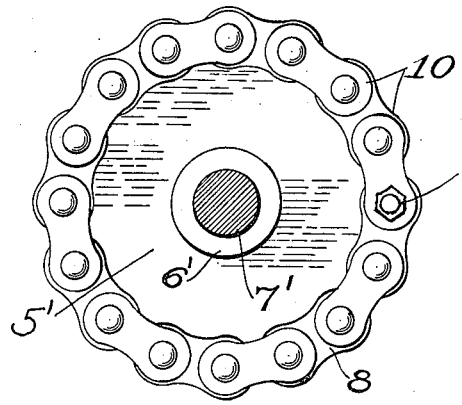
Figure 1 is an end view of the coupling.
Figure 2:
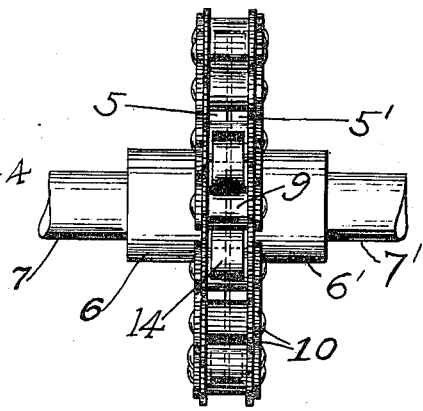
Fig. 2 is an edge or side view of the coupling.
Figure 3:
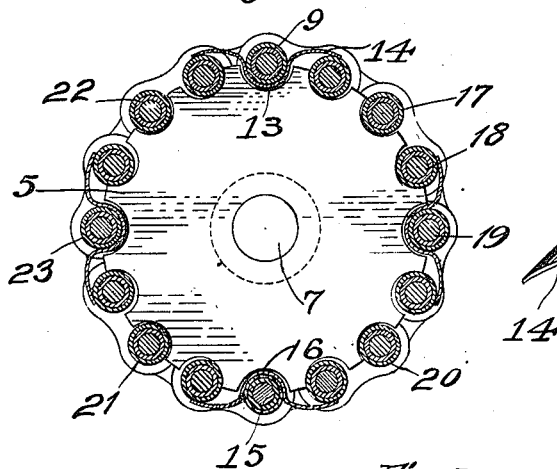
Fig. 3 is a sectional end view of the coupling taken through the center line of Fig. 2.

In the embodiment of the invention shown in the drawing, the members to be coupled together are the shafts 7 and 7'. Upon the ends of these shafts, respectively, are mounted the hubs 6 and 6' bearing the sprocket wheels or sprocket-cut disks 5 and 5'. The sprockets of these sprocket wheels may be cut off along the pitch line, as shown in Fig. 3. Surrounding both sprocket wheels and engaging the sprockets of both is the loop of chain 8. The chain shown in the drawing is what is known as a roller chain consisting of links comprising side bars 10, connected by means of pivots, which, in the form shown, consist of rivets surrounded by bushings, which are surrounded by cylindrical rollers (Fig. 3). In one of the pivots, a bolt 4 is used instead of a rivet in order that the device may be assembled and taken apart.

In the drawing, the shafts 7 and 7' are shown in exact alinement. As pointed out in my previous application hereinbefore referred to, the flexibility of the coupling renders unnecessary exact alinement of the shafts. They are here shown in such alinement merely for convenience in illustration.

Figure 4:
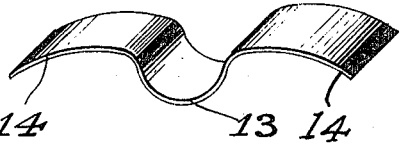
Fig. 4 is a perspective view of one type of spring which may be used to prevent the back-lash.

To eliminate the back-lash in the coupling, I make use of a spring or springs, which may be of the form shown in Fig. 4, having a semi-circular depression 13, at the center and an outwardly extending resilient wing 14, on either side, each of said wings being of a length at least equal to the diameter of said depression 13. Such a spring is placed in operative connection with the coupling by passing the depressed portion 13 under one of the pivots of the chain. The extending portions or wings 14, then press upon the top or outer side of the adjacent pivots, as shown in Fig. 3. When placed in this position the spring tends to draw the pivot under which it passes away from the sprocket wheel and out of the substantially circular line in which the pivots normally lie. By pushing one pivot of the chain thus out of line, the spring tends to draw together the adjacent pivots on either side of said pivot and thus to decrease the effective diameter of the loop of chain, so that all portions of the chain except that raised by the spring are tightly drawn against the sprocket wheels. The spring is strong enough to draw the chain sufficiently tight to prevent any back-lash when the coupling is used upon reciprocating machinery, while it is not strong enough to prevent the chain from being drawn out to its original length when necessary because of any irregularity in the motion of the shafts. In other words, the spring, while preventing back-lash, does not interfere with the flexibility of the coupling.

For purposes of illustration I have shown in Fig. 3 the use of four such springs as I have described. These are placed under every fourth pivot. The result of this arrangement, as shown in Fig. 4, is to lift the pivots 9, 19, 15 and 23 under which the springs pass out of contact with the sprockets. The pivots adjacent to each of the pivots just referred to are drawn tightly against the sides of the sprocket notches toward the pivots under which the springs pass, while the pivots 17, 20, 21 and 22 are drawn tightly into the middle of their respective notches. By holding the pivots in this position the springs eliminate all back-lash.

Figure 5:
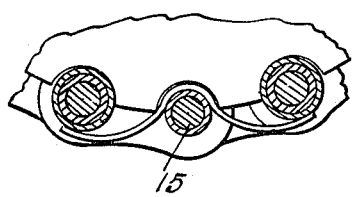
Fig. 5 is a sectional side elevation of the springs bearing on the roller-pivots at the ends thereof, and upon a spacing block intermediate the ends.

In order to provide room for the springs, the sprocket notches beneath the rollers under which the springs pass may be cut slightly larger than the remaining sprocket notches, as shown in Fig. 3 in the notches corresponding to the pivots 9, 19 and 23. In some cases this is undesirable, as it has some tendency to weaken the sprocket teeth. An alternative way of providing space for the spring is, therefore, shown in connection with the pivot 15. The outer roller of the pivot 15 is removed so that the recessed portion 13 of the spring (which in this case is bent to fit over the bushing instead of to fit outside of the roller) occupies the space which would otherwise be occupied by the roller. (See Fig. 5.) It is, therefore, unnecessary to make the sprocket notch 16 any larger than the notches under the pivots which are not surrounded by springs.

It is obvious that many changes may be made in the specific device shown without departing from my invention. It is not necessary, for example, that any special number of springs be used; nor is the form of the spring used material, it being merely necessary that the spring should operate so as to cause the loop of chain to be drawn tightly against the wheels; nor is the invention limited to any particular form of chain. Not only a roller chain but any form of chain adapted to run over any sort of sprocket may be substituted for that shown in the drawing, or the wheel may be connected by means other than a chain. Any form of disk or hub adapted to be engaged by an encircling member may be substituted for the sprocket wheels.

What I claim is:—

1. A coupling comprising two resiliently connected sprocket wheels mounted respectively upon the members to be coupled, and a chain encircling said wheels and connecting the same.

2. A coupling comprising two adjacent toothed disks mounted respectively on the members to be coupled, means for connecting said disks, and a spring between said means and said disks.

3. A coupling comprising two adjacent toothed disks mounted, respectively, on the members to be coupled, means for connecting said disks, and a plurality of springs between said means and said disks.

4. A coupling comprising two adjacent toothed disks mounted respectively on the members to be coupled, connecting means surrounding and engaging said disks, and a spring between said connecting means and said disks.

5. A coupling comprising two adjacent toothed disks mounted, respectively, on the members to be coupled, connecting means surrounding and engaging said disks, and a plurality of springs between said connecting means and said disks.

6. A coupling comprising two adjacent sprocket wheels mounted respectively upon the members to be coupled, a loop of chain encircling said sprocket wheels, and spring means bearing against the inside of said chain loop and arranged to draw said loop of chain tightly against said sprocket wheels.

7. A flexible coupling comprising two adjacent sprocket wheels mounted respectively upon the members to be coupled, a loop of chain encircling said sprocket wheels, and spring means bearing against the inside of said chain loop and arranged to push a portion of said chain away from said sprocket wheels, whereby the remaining portion of the chain is drawn tightly against said sprocket wheels.

8. A flexible coupling comprising two adjacent sprocket wheels mounted respectively upon the members to be coupled, a loop of chain encircling said sprocket wheels and comprising pivotally connected members, and spring means co-acting with and bearing against the inner side of said chain members, and arranged to push a portion of said chain away from said sprocket wheels, whereby the remaining portion of said chain is drawn tightly against said sprocket wheels.

9. A flexible coupling comprising two adjacent sprocket wheels mounted respectively upon the members to be coupled, a loop of chain encircling said sprocket wheels and consisting of pivots and links connected by said pivots, and spring means arranged to bear against the inner side of said pivots and push one or more of the link pivots of said chain away from said sprocket wheels, whereby the remaining link pivots are drawn tightly against said sprocket wheels.

10. A flexible coupling comprising two adjacent sprocket wheels mounted respectively upon the members to be coupled, a loop of chain encircling said sprocket wheels and consisting of pivots and links connected by said pivots, and spring means co-acting with said link pivots and arranged to bear against the inner side of said pivots and push one or more said link pivots away from said sprocket wheels, whereby the remaining link pivots are drawn tightly against said sprocket wheels.

11. A flexible coupling comprising two adjacent sprocket wheels mounted respectively upon the members to be coupled, a loop of chain encircling said sprocket wheels and comprising pivots and links connected by said pivots, and a spring arranged to bear against the inner side of said pivots and push one or more of said link pivots away from said sprocket wheels, whereby the effective diameter of said loop of chain is reduced and said chain is drawn tightly against said sprocket wheels.

12. A flexible coupling comprising two adjacent sprocket wheels mounted respectively upon the members to be coupled, a loop of chain encircling said sprocket wheels and comprising pivots and links connected by said pivots, and a spring passing under one of said pivots and over two adjacent pivots, whereby the pivot under which said spring passes is pushed away from said sprocket wheels and the remaining portion of the chain is drawn tightly against said sprocket wheels.

13. A coupling comprising two adjacent disks containing sprocket notches mounted, respectively, on the members to be coupled, a loop of chain encircling said disks and comprising pivots engaging said notches and links connected by said pivots, one or more of said pivots engaging their notches more loosely than the remaining pivots, and springs passing under said pivots which engage their notches more loosely than the remaining pivots and over the pivots adjacent to said pivots.

14. A coupling comprising two adjacent sprocket wheels mounted respectively on the members to be coupled, a loop of chain encircling said sprocket wheels and comprising pivots and links connected by said pivots, one or more of which are of less diameter than the remaining pivots, and springs passing under said pivots of less diameter and over the pivots adjacent to said pivots.

15. Two substantially axially alined members of a shaft coupling, in combination with a flexible element for connecting said members, said element comprising a spring normally buckling the same.

16. Two substantially axially alined members of a shaft coupling, in combination with a flexible element for connecting said members, said element comprising a leaf spring inserted therein and normally buckling the same.

17. A chain for connecting two substantially axially alined members of a shaft coupling, said chain comprising transverse members and a leaf spring passing under one transverse member of the chain and engaging the outer faces of the two adjacent transverse members of the chain.

18. In a shaft coupling, substantially axially alined members provided with teeth, in combination with a flexible element surrounding said members to connect them together to transmit motion from one to the other, and resilient means inserted in said flexible element to yieldingly hold said element in engagement with the teeth of said members.

19. A spring for insertion in a chain to impart resiliency to the same and consisting of a substantially semi-circular medial depression and two resilient wings extending in opposite directions from said depression and being of a length at least equal to the diameter of said depression, said depression being adapted to engage the under face of one transverse member of the chain, and the wings being adapted to engage, respectively, the upper faces of adjacent transverse members of the chain on each side of the first mentioned transverse member.

CHARLES HASKELL CLARK.